United States Patent [19]

Foller et al.

[11] Patent Number: 4,955,536
[45] Date of Patent: Sep. 11, 1990

[54] THERMALLY CONTROLLED VALVE

[75] Inventors: Werner Foller, Stuhr; Holm Klann, Bremen, both of Fed. Rep. of Germany

[73] Assignee: Gestra Aktiengesellschaft, Bremen, Fed. Rep. of Germany

[21] Appl. No.: 404,278

[22] Filed: Sep. 7, 1989

[30] Foreign Application Priority Data

Sep. 16, 1988 [DE] Fed. Rep. of Germany ....... 3831474
Jul. 28, 1989 [DE] Fed. Rep. of Germany ....... 3925032

[51] Int. Cl.⁵ .......................... G05D 23/10; F16T 1/10
[52] U.S. Cl. ....................................... 236/48 R; 236/58
[58] Field of Search ........................ 236/48 R, 56, 58; 251/75

[56] References Cited

U.S. PATENT DOCUMENTS 2,739,454  3/1956  Noaker .................................. 62/140
3,236,262  2/1966  Dobbin ........................... 236/48 R X
3,361,347  1/1968  Reichel et al. ..................... 236/48 R
3,474,962  10/1969  Visos ................................. 236/48 R
4,339,075  7/1982  Schittek et al. ........................ 236/59

Primary Examiner—William E. Tapolcai
Attorney, Agent, or Firm—Collard, Roe & Galgano

[57] ABSTRACT

A thermally controlled valve is provided having a valve seat, a closure valve cooperating with the valve seat, a diaphragm capsule, a plate spring, and an abutment supporting the plate spring along its outer edge. The diaphragm capsule includes a rigid wall part and a diaphragm component actuating the closure valve, the wall part and the diaphragm component being joined with each other along their outer edges and forming a reservoir therebetween for an evaporation medium. The plate spring rests against the face side of the diaphragm component which is averted from the wall part of the diaphragm capsule, and the inner edge of the plate spring engages the closure valve so as to act thereon in the opening direction.

17 Claims, 3 Drawing Sheets

THERMALLY CONTROLLED VALVE

The present invention relates to a thermally controlled valve and, more particularly, it relates to a condensate drain valve consisting of a valve seat, a closure valve cooperating therewith, an expansion or diaphragm capsule having a rigid wall element and a diaphragm component actuating the closure valve, the wall element and diaphragm component being joined with each other at their outer edges and forming between them a reservoir for the evaporation medium, a spring biasing the closure valve in the opening sense, and an abutment for the spring.

The spring acting in such valves on the closure valve in the opening sense offers the advantage that the valve, in the event of leakage or failure of the expansion or diaphragm capsule, assumes the open position. Such behavior is required in some process engineering applications. In order that such behavior is assured with the entire range of operating pressures of the valve, the spring must be dimensioned so that it is capable, in the event of leakage, of overcoming the high closing force of the closure valve resulting from the highest operating pressure. If it is intended that such valve closes at the maximum operating pressure with the diaphrahm capsule intact, then relatively low closing force of the diaphragm capsule is sufficient therefor because high closing force already prevails at the closure valve. The low closing force of the diaphragm capsule is transferred by the diaphragm component to the closure valve. If, on the other hand, the valve is used at low pressure, then closing force of the closure valve is also low. The magnitude of the spring force operative in the direction of opening remains, however, unchanged. In this instance, in order to close the valve, relatively high closing force will have to be exerted by the diaphragm capsule. This high force must be transferred by the diaphragm component. A high force, however, produces high stress in the diaphragm component. The operating pressure range or the useful life of the diaphragm of known designs (see, for instance, DE-PS 23 513) of such a valve is limited for that reason.

It is, therefore, the object of the present invention to provide a thermally controlled valve of the type described above, that is suitable for a wide operating pressure range and characterized by a long diaphragm service life.

This object is accomplished in accordance with the present invention by providing a thermally controlled valve as described above, wherein the spring is a plate spring which rests against the face side of the diaphragm component averted from the wall element, the outer edge of the plate spring being supported on the abutment, and the inner edge of the plate spring engaging the closure valve or a support therefor. In any position of stroke or lift, the diaphragm is thus supported across its total radial expanse by the plate spring, which requires very little or limited constructional height. The closing force resulting from the pressure difference prevailing between the reservoir of the diaphragm capsule and the high-pressure side is thereby directly transmitted to the plate spring and the closure valve. The relatively high stress that would otherwise occur in the diaphragm component, that is, if the diaphragm itself were transmitting the closure force, is eliminated. The diaphragm component is substantially subjected to only the relatively low stress resulting from the lifting motion or stroke. Thus, the valve according to the present invention is suitable for a wide operating pressure range and is characterized by a long diaphragm service life.

In a preferred embodiment of the present invention, the plate spring is a snap spring which is arranged so that in the closed position of the valve, the spring occupies a position of stroke lying in the range of stroke between the force maximum and the force minimum of its force-stroke characteristic. Preferably the snap spring is monostable so that the direction of spring force throughout its stroke always remains the same. For example, no reversal of pressure force into tensile force occurs. The opening force applied to the closure valve by the snap spring diminishes during the closing stroke from a wide-open position to the closed position. Therefore, when the opening temperature is reached, the closure valve is snapped into a wide-open position which, in the presence of low quantities of condensate, exceeds the opening required for a constant discharge, which opening is strived for by the spring-elastic diaphragm capsule. Consequently, a small amount of condensate is passed through in the shortest amount of time. Subsequently, the valve abruptly closes again from the wide-open position. By using a snap spring instead of a conventional spring or so-called creeping spring, wear-promoting throttling positions of the closure valve are avoided.

In another embodiment of the present invention, a second plate spring is utilized which rests against the face side of the diaphragm component which faces the wall element of the expansion or diaphragm capsule and which engages an abutment at its outer edge. Without such a second plate spring, the pressure difference permissible for the diaphragm component, and to that extent also the operating pressure range of the valve, could be theoretically increased to very high values by using a plate spring with a correspondingly high opening force. For closing the valve, this spring force must be overcome by the pressure force of the evaporation medium. In the lower part of the operating pressure range, this takes place at correspondingly lower temperature. The operating pressure range is thus limited by the absence of evaporation media that would be suitable for this. The additional second plate spring permits the diaphragm component to support itself in the opening sense across its entire radial extent, that is, from the outer to the inner edge. The opening force resulting from a pressure difference prevailing on the diaphragm component is directly transmitted to the second plate spring and the closure valve, without any high, damaging stresses occurring in the diaphragm component. In this way, the operating pressure range of the valve can be significantly increased beyond the range attainable with the available evaporation media in the arrangement with only the one plate spring.

In a further embodiment of the two spring valve, the second plate spring is designed as an opening spring and the closure valve is provided with a driver which engages the inner edge of the second plate spring on the side thereof averted from the diaphragm component. Thus, the spring force of each of the two plate springs is directed toward opening of the closure valve. In the open position of the valve, the second plate spring either may be relieved or it may already be pretensioned. The spring force generated by the second plate spring, as well as any pressure force that may be transmitted to the second plate spring by supporting of the diaphragm component, is applied to the closure valve through the drive. Because of the distribution of the opening spring force of two plate springs, the tension in the individual plate spring are particularly low, so that their useful life is particularly long.

In connection with this last embodiment, it is possible to select a low spring force for the second plate spring. However, this spring force must at least be sufficiently high to assure the support function of the plate spring in the upper range of the overall operating pressure range of the valve. A second plate spring, thus dimensioned, can be supported with its outer edge directly on the diaphragm component without impairing the useful life of the diaphragm. An abutment of the side of the diaphragm for the outer edge of the second plate spring can be dispensed with in this case. However, provision must be made for such an abutment if the opening spring force of the second plate spring is high.

In another embodiment of the two spring valve, the second plate spring is designed as a closing spring so that the forces of the two plate springs act against each other. This permits using plate springs with a particularly high spring force and with correspondingly high supporting capability. This, in turn, permits an extremely wide operating pressure range. As a result of the fact that the spring forces are competing, the resulting force applied to the closure valve by the plate springs can be very low. Despite the particularly high supporting effect, this low spring force can be within the range established by the available evaporation media. In connection with this embodiment, when the closing force of the second plate spring is selected as low as possible, for example, only high enough to support the diaphragm component within the entire upper part of the pressure range, the closure valve is provided with a driver which engages behind the inner edge of the second plate spring away from or averted from the diaphragm component. The opening force which is transmitted in this case by the second plate spring is introduced to the closure valve via the drive. Due to its low closing force, the second plate spring, in the lower end of the pressure range, can support itself with its inner edge directly on the diaphragm component for closing the valve without impairing the useful life of the diaphragm component.

Where it is desired to prevent the second plate spring from being directly supported on the diaphragm component with its inner surface, the closure valve is provided with a drive which engages behind the inner edge of the second spring plate on its side facing the diaphragm component. This arrangement is especially beneficial if the second plate spring has a very high closing force. With this embodiment of the drive, when the second plate spring, in the upper part of the pressure range, moves in the opening direction of the closure valve because of the pressure difference acting on the diaphragm component, the closure valve directly follows the second plate spring under the opening action of the first plate spring. Although with this design of the driver, the second plate spring is not capable of exerting any opening force on the closure valve, faultless opening of the valve is nevertheless assured.

In the two plate spring embodiment, if the first and second plate springs are provided with force-stroke characteristics having flat extending characteristic ranges and both plate springs are arranged so that both in the closed and open positions of the valve, the springs occupy stroke positions within the flat extending range of their characteristic, so that the two plate springs almost compensate each other throughout the entire closing stroke. This is highly advantageous in the selection of the evaporation medium.

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

Figure 1:
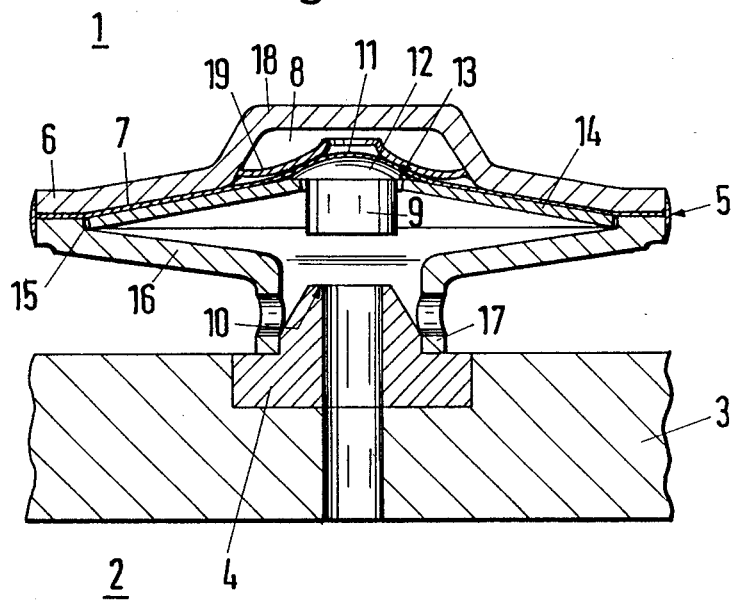
FIG. 1 is a cross-sectional view of a first embodiment of the valve according to the present invention in the open position.

Now turning to the drawings, there is shown in FIG. 1, a separating wall 3 arranged between high-pressure side 1 and low-pressure side 2 in the valve casing (not shown) which supports a seat element 4. On high-pressure side 1, that is, upstream of seat element 4, a diaphragm or expansion capsule 5 is arranged, having a rigid wall part 6 and a diaphragm component 7, which between them form a reservoir 8 for an evaporation medium. Diaphragm component 7 actuates a closure valve 9 disposed upstream of seat element 4. A valve seat 10 for closure valve 9 is arranged on seat element 4.

Diaphragm component 7 is provided with a central, cup-shaped bearing recess 11 projecting into reservoir 8. A cup-shaped crown 12 of the closure valve 9 rests in bearing recess 11. Crown 12 may be either rigidly connected with diaphragm component 7, or rest against the latter, as in the present case. At the level of the edge of bearing recess 11, crown 12 has an axial working surface 13, which is acted upon by the inner edge of a plate spring 14 in the opening sense. At the same time, plate spring 14 rests against the face side of diaphragm component 7 averted from wall part 6. At its outer edge, on the side averted from the diaphragm, plate spring 14 is supported in a recess 15 of a concavely curved annular disk 16, which functions as an abutment. On the inner edge of annular disk 16, holding means 17 supports disk 16 on seat element 4. On its outer edge, annular disk 16 is rigidly and tightly connected, or preferably welded with diaphragm component 7 and wall part 6.

Wall part 6 is designed in the form of a dish and has a central, pot-like protrusion 18. The inside diameter of protrusion 18 is substantially larger than the outside diameter of closure valve 9. In this way, protrusion 18 offers an adequate reservoir 8 for the evaporation medium with a relatively low constructional height. A perforated disk 19 is disposed in protrusion 18 and fastened on wall part 6, for example by spot welding, within the region of the edge of protrusion 18.

In the cold condition, the evaporation medium in reservoir 8 is condensed and its vapor pressure is practically zero. Diaphragm component 7 and closure valve 9 are maintained in the final open position by plate spring 14 and the pressure prevailing on high-pressure side 1. In this position, diaphragm component 7 is supported over much of its surface by wall part 6 and disk 19. As disk 19 offers a stop surface for diaphragm 7 also within the region arching across crown 12 of the closure valve, closure valve 9 is supported by means of the diaphragm component 7 as well.

When diaphragm capsule 5 is heated, for example by condensate surrounding it, evaporation takes place in reservoir 8, and the vapor pressure of the evaporating medium associated within the given temperature develops therein. When the temperature and thus the pressure inside reservoir 8 are sufficiently high, diaphragm component 7 lifts from wall part 6 and disk 19, resting on plate spring 14 and crown 12 of the closure valve. With a corresponding increase in temperature and thus of the inside pressure, closure valve 9 is moved by diaphragm component 7 against the action of plate spring 14 in the closing direction and caused to rest on valve seat 10, sealing the latter. During the entire closing stroke, diaphragm component 7 is supported by plate spring 14 and crown 12 of the closure valve over a large surface area. The closing force resulting from the difference in pressure between reservoir 8 and high-pressure side 1 is absorbed by plate spring 14. This will not load diaphragm component 7, but subject the latter only to the relatively low bending stresses produced by the lifting movement. In this way, diaphragm component 7 can be used at high pressure differences, and it has a very long useful life.

When opening temperature is admitted to diaphragm capsule 5, the inside pressure of reservoir 8 drops far enough to permit the opening force of plate spring 14 to overcome the prevailing closing forces and to move diaphragm component 7 and closure valve 9 into the open position. In this process, diaphragm component 7 is not required to apply any opening force to closure valve 9. In fact, component 7 cannot apply such force because fastening of closure valve 9 on diaphragm component 7 has been dispensed with.

On the other hand, when crown 12 of the closure valve and diaphragm component 7 are rigidly connected with each other, the diaphragm component is capable of exerting an opening force on closure valve 9. In this way, the valve can open even if plate spring 14 should be defective, i.e., broken or relaxed.

If diaphragm capsule 5 should be subjected to very high overheating leading to an extreme inside pressure, annular disk 16 supports plate spring 14 and in this way diaphragm component 7. Even in such a case, diaphragm component 7 is, consequently, not overloaded.

Figure 2:
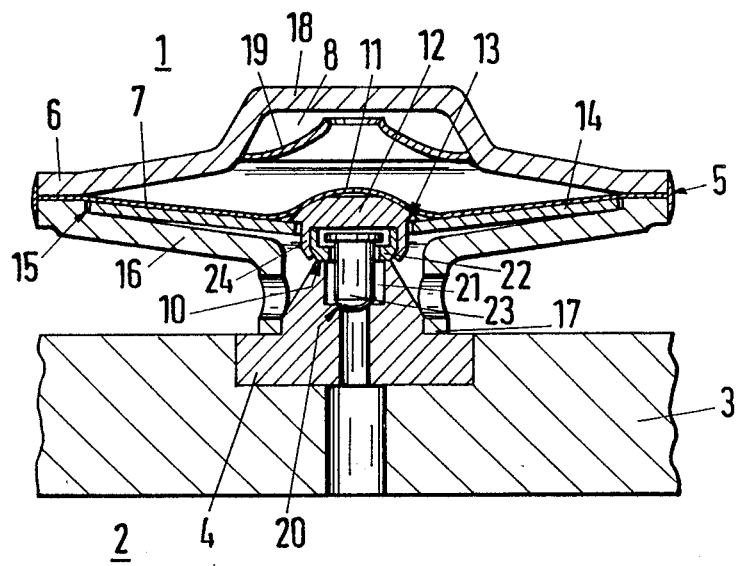
FIG. 2 is a cross-sectional view of a second embodiment of the valve according to the present invention in the closed position.

The embodiment according to FIG. 2 differs from that of FIG. 1 in that an arrangement of two closure valves and two valve seats is provided. An additional valve seat 20 is provided downstream of valve seat 10, with a chamber 21 extending between the two valve seats. A first annular closure valve 22 cooperates with first valve seat 10, and a second closure valve 23 arranged in chamber 21 cooperates with second valve seat 20. Second closure valve 23 is coupled with first closure valve 22 to a limited extent, to be relatively stroke-displaceable with respect thereto. First closure valve 22 is tightly fastened in a closure valve support 24. Support 24 is provided with crown 12, which is centrally supported in bearing recess 11, and working surface 13 for the inner edge of plate spring 14.

In the embodiment according to FIG. 2, the two closure valves 22 and 23 open or close one after the other with a delay as a result of the relative stroke between the closure valves. This permits an intermittent mode of operation even with the smallest quantities of condensate, which prevents wear due to erosion at shut-off sites 10, 22, 20 and 23.

Figure 3:
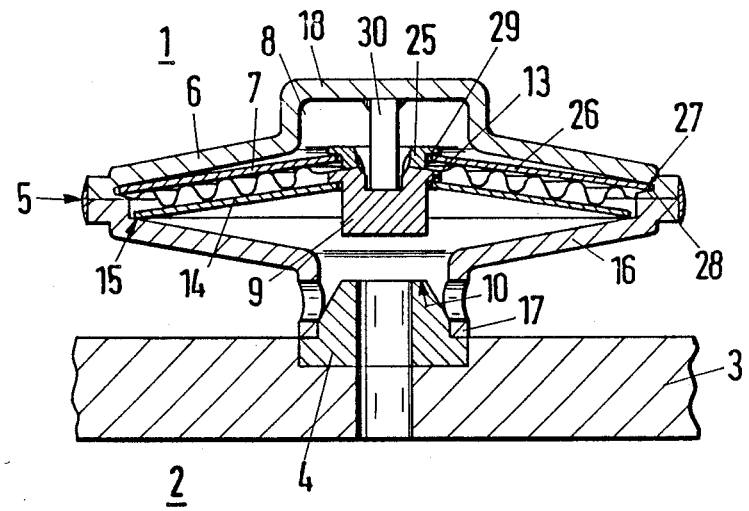
FIG. 3 is a cross-sectional view of a third embodiment of the valve according to the present invention in the open position.

In FIG. 3, closure valve 9 and a driver support 25 are rigidly and tightly fastened centrally on diaphragm component 7, preferably by joining these three parts with each other by welding. Driver support 25 is disposed in reservoir 8, that is, on the side of diaphragm component facing wall part 6. Instead of closure valve 9, a closure valve support may be fastened on diaphragm component 7 in a way similar to the embodiment shown in FIG. 2, such support supporting one or two closure valves and having working surface 13. A second plate spring 26 is disposed in reservoir 8 between diaphragm component 7 and wall part 6. Wall part 6 is provided with a recess 27 serving as the abutment for the outer edge of second plate spring 26 on the side thereof averted from the diaphragm. Provision is made for an abutment 28 on the outer edge of the second plate spring on the side thereof that faces the diaphragm. Driver support 25 has a driver 29 engaging behind the inner edge of plate spring 26 on the face side thereof averted from the diaphragm. The spring force of second plate spring 26 is directed in the opening direction of the closure valve.

In the cold condition, diaphragm component 7 and closure valve 9 are maintained in the final open position by the two plate springs 14 and 26, as well as by the pressure prevailing on the high-pressure side 1. This final open position is defined by stop means 30, for which provision is made on wall part 6, which engages on closure valve 9. Means 30 may alternatively or additionally engage on driver support 25, which is rigidly connected with closure valve 9.

In the final open position, diaphragm component 7 is supported over a large surface area by second plate spring 26 against any pressure difference that may act in the opening sense.

When the diaphragm capsule 5 is subjected to a rising temperature, vapor pressure of the evaporating medium corresponding with the given temperature develops in reservoir 8. This vapor pressure generates a closing force acting on closure valve 9, which is counteracted by the resulting spring force of the two plate springs 14 and 26, as well as by the pressure force acting in the opening direction when diaphragm component 7 rests against second plate spring 26. As soon as the vapor pressure in reservoir 8 exceeds the pressure on high-pressure side 1, diaphragm component 7 lifts slightly from second plate spring 26 and comes to rest against first plate spring 14. When the closing temperature is reached the vapor pressure in reservoir 8 is sufficiently high to cause closure valve 9 to move in the closing direction against the resulting spring force of the two plate springs 14 and 26, and to come to rest on seal valve seat 10. During the entire closing stroke, diaphragm component 7 is supported by plate spring 14 over a large surface area.

When the opening temperature is admitted to diaphragm capsule 5, the vapor pressure in reservoir 8 drops. Thereupon, the resulting spring force of plate springs 14 and 26, which force acts in the opening sense, overcomes the closing forces which depend on the differential pressure. This moves diaphragm component 7 and closure valve 9 to the open position, with diaphragm component 7 being supported over a large surface area by first plate spring 14.

The foregoing describes the opening and closing function within the lower part range of the operating pressure range of the valve.

The lower part range of the operating pressure range comprises those operating pressures at which, in the presence of closing temperature, the resulting spring force of the two plate springs 14 and 26 acting in the opening direction exceeds the closing force produced by the pressure on closure valve 9. The upper part pressure range comprises operating pressures at which, in the presence of closing temperature, the resulting spring force of the two plate springs 14 and 26 acting in the opening direction is less than the closing force produced by the pressure on closure valve 9.

The way the valve functions in the upper part range of the overall pressure range differs from the way it functions in the lower part range of the operating pressure range in that diaphragm component 7 rests against second plate spring 26 during both the opening and the closing strokes or lifts under the always prevailing pressure difference.

If, in the closed position, a high pressure rise should occur in reservoir 8, for example due to high overheating, diaphragm component 7 is supported on first plate spring 14 also in the upper pressure range.

Throughout the entire operating pressure range, diaphragm component 7 is supported over a large surface area during both the opening and closing strokes, and subjected only to minor bending stresses produced by the lifting motion. Second plate spring 26 makes it possible in this operation to substantially widen the operating pressure range of the valve upwardly when using the available evaporation media.

In the embodiment according to FIG. 3, second plate spring 26 can be alternatively designed as a closing spring. This reduces the resting spring force acting on closure valve 9 in the opening direction, which has a beneficial effect in the selection of the evaporation medium or size of the operating pressure range. If second plate spring 26 is embodied in the form of a closing spring, abutment 28 for the outer edge of second plate spring 26 on the side thereof facing the diaphragm can be dispensed with. Otherwise, the function of the valve corresponds in all other respects with the one described in connection with FIG. 3.

Figure 4:
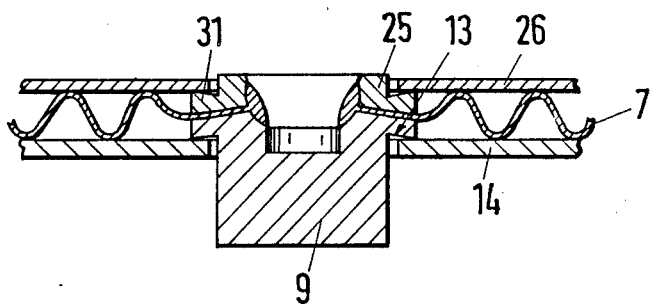
FIG. 4 is an enlarged detail view of the diaphragm capsule shown in FIG. 3 in another embodiment in the partly open position.

In the embodiment shown in FIG. 4, second plate spring 26 is designed in the form of a closing or locking spring. Driver support 25 has a driver 31 engaging the inner edge of plate spring 26 on its face side facing the diaphragm. The inner edge of plate spring 26 therefore does not come to rest on diaphragm component 7. This is especially advantageous if the spring force is high. When second plate spring 26 performs a lifting motion in the opening direction due to a prevailing difference in pressure, closure valve 9 directly follows second plate spring 26 due to the action of first plate spring 14. The aforementioned advantages with respect to operating pressure range and support of diaphragm component 7 are obtained with this embodiment as well.

Due to the fact that the spring forces of the two plate springs 14 and 26 counteract each other, it is possible to use plate springs 14 and 26 with very high spring forces that will reliably and safely support diaphragm component 7 even under extremely high pressure differences. The resulting spring force acting on closure valve 9 in the opening sense is nevertheless relatively low. In this connection, it was found that it is highly advantageous also to use plate springs 14 and 26 with characteristic lines or curves extending horizontally or flat in the utilized range of lift or stroke, because this will keep the resulting spring force nearly constant across the stroke.

Figure 5:
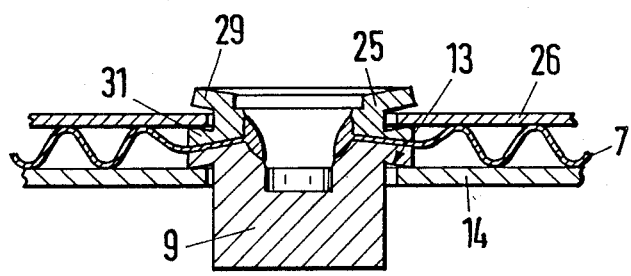
FIG. 5 is an enlarged detail view of the diaphragm capsule shown in FIG. 3 in yet another embodiment.

In the embodiment shown in FIG. 5, second plate spring 26 is designed in the form of a locking or closing spring as well. However, driver support 25 is provided with drivers 29 and 31 disposed on each side of diaphragm component 7, respectively. Thus, both the closing and opening forces can be applied by plate spring 26 directly to driver support 25 and thus to closure valve 9.

In the valves according to the invention, the diaphragm component may consist of a single diaphragm or a plurality of diaphragm lamellas disposed one on top of the other. Such diaphragm lamellas result in a particularly high flexibility of the diaphragm component. The diaphragm or diaphragm lamellas may have a smooth surface or concentric corrugations. Such corrugations absorb the radial dimensional variations occurring during the lifting motion without distorting the diaphragm component.

Figure 6:
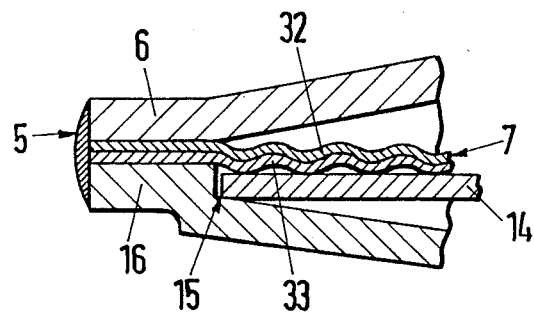
FIG. 6 is an enlarged detail view of the diaphragm capsules shown in FIGS. 1 and 2 in partly open position.

Preferably, diaphragm component 7 consists of two diaphragm lamellas 32 and 33 with concentric corrugations, said lamellas being disposed one on top of the other as clearly shown in FIG. 6. In the outwardly curved state, that is, the final open position, diaphragm component 7 is clamped between wall part 6 and annular disk 16, and subsequently fused with said two elements. In this way, tensile stresses in diaphragm component 7 are avoided.

Plate springs 14 and 26 may be embodied without or with breakthroughs or radial recesses.

Although several embodiments of the present invention have been shown and described, it will be obvious that many changes and modifications may be made thereunto without departing from the spirit and scope of the invention.

What is claimed is:

1. A thermally controlled valve, in particular, a condensate drain valve, comprising:

a valve seat;

a closure valve cooperating with said valve seat;

a diaphragm capsule having a rigid wall part and a diaphragm component actuating said closure valve, said wall part and said diaphragm component being joined with each other along their outer edges and forming a reservoir therebetween for an evaporation medium;

a plate spring;

an abutment for said plate spring;

said plate spring being supported on said abutment along its outer edge and resting in direct contact with and against the face side of said diaphragm component which is averted from the wall part of said diaphragm capsule, the inner edge of said plate spring engaging said closure valve so as to act thereon in the opening direction; and said diaphragm being in direct contact with and supported across its total radial expanse by said plate spring.

2. The thermally controlled valve as defined in claim 1, which further comprises a closure valve support connected to said closure valve and with which the inner edge of said plate spring engages.

3. The thermally controlled valve as defined in claim 1, wherein the abutment comprises an annular disk rigidly connected at its outer edge with said diaphragm capsule and, on its side facing said diaphragm capsule, having a recess for receiving said plate spring.

4. The thermally controlled valve as defined in claim 1, wherein said plate spring is a snap spring which is arranged so that in the closed position of the valve, it occupies a position of stroke lying in the range of stroke between the force maximum and the force minimum of its force-stroke characteristic.

5. A thermally controlled valve, in particular, a condensate drain valve, comprising:
 a valve seat;
 a closure valve cooperating with said valve seat;
 a diaphragm capsule having a rigid wall part and a diaphragm component actuating said closure valve, said wall part and said diaphragm component being joined with each other along their outer edges and forming a reservoir therebetween for an evaporation medium;
 a plate spring; and
 an abutment for said plate spring;
 said plate spring being supported on said abutment along its outer edge and resting against the face side of said diaphragm component which is averted from the wall part of said diaphragm capsule, the inner edge of said plate spring engaging said closure valve so as to act thereon in the opening direction;
 said diaphragm component being provided with a central, cup-shaped bearing recess, and said closure valve having a crown which is arranged in said bearing recess,
 said crown at the edge of the bearing recess having an axially arranged working surface for the plate spring.

6. A thermally controlled valve, in particular, a condensate drain valve, comprising:
 a valve seat;
 a closure valve cooperating with said valve seat;
 a diaphragm capsule having a rigid wall part and a diaphragm component actuating said closure valve, said wall part and said diaphragm component being joined with each other along their outer edges and forming a reservoir therebetween for an evaporation medium;
 a plate spring; and
 an abutment for said plate spring;
 said plate spring being supported on said abutment along its outer edge and resting against the face side of said diaphragm component which is averted from the wall part of said diaphragm capsule, the inner edge of said plate spring engaging said closure valve so as to act thereon in the opening direction;
 said wall part of said diaphragm capsule being in the form of a dish and being provided with a central, pot-like protrusion, the inside diameter of said protrusion being larger than the outside diameter of said closure valve, said protrusion having a stop means for said diaphragm component fixedly arranged therein.

7. The thermally controlled valve as defined in claim 6, wherein said stop means is a disk whose outer edge is fixed on said wall part at the edge of said protrusion.

8. A thermally controlled valve, in particular, a condensate drain valve, comprising:
 a valve seat;
 a closure valve cooperating with said valve seat;
 a diaphragm capsule having a rigid wall part and a diaphragm component actuating said closure valve, said wall part and said diaphragm component being joined with each other along their outer edges and forming a reservoir therebetween for an evaporation medium;
 a plate spring; and
 an abutment for said plate spring;
 said plate spring being supported on said abutment along its outer edge and resting against the face side of said diaphragm component which is averted from the wall part of said diaphragm capsule, the inner edge of said plate spring engaging said closure valve so as to act thereon in the opening direction;
 said plate spring being a first plate spring and which further comprises:
 a second plate spring resting against the face side of said diaphragm component facing the wall part of said diaphragm capsule; and
 an abutment for the outer edge of said second plate spring.

9. The thermally controlled valve as defined in claim 8, wherein said second plate spring is designed in the form of an open spring and said closure valve has a drive engaging behind the inner edge of said second plate spring on its face side averted from said diaphragm component.

10. The thermally controlled valve as defined in claim 8, wherein said second plate spring is designed in the form of a closing spring.

11. The thermally controlled valve as defined in claim 10, wherein said closure valve has a driver engaging behind the inner edge of the spring plate spring on its face side averted from said diaphragm component.

12. The thermally controlled valve as defined in claim 10, wherein said closure valve has a driver engaging behind the inner edge of said second plate spring on its face side facing said diaphragm component.

13. The thermally controlled valve as defined in claim 10, wherein said closure valve has drivers engaging behind the inner edge of said second plate spring on its two face sides.

14. The thermally controlled valve as defined in claim 8, wherein:
 said first plate spring has a force-stroke characteristic with a flat-extending characteristic range; and
 said second plate spring has a force-stroke characteristic with a flat-extending characteristic range;
 both said plate springs being arranged so that both in the valve closed and valve open positions, said plate springs occupy stroke positions in the flat extending range of the characteristic curve.

15. The thermally controlled valve as defined in claim 8, wherein the wall part of said diaphragm capsule is provided with said abutment for said second plate spring.

16. The thermally controlled valve as defined in claim 15, wherein the wall part of said diaphragm capsule is embodied in a dish-like form and, on its side facing the diaphragm component, has a recess for receiving said second plate spring.

17. The thermally controlled valve as defined in claim 8, wherein the wall part of said diaphragm capsule has stop means cooperating with the closure valve so as to limit the opening stroke of said closure valve.

* * * * *